June 28, 1949.  L. E. PAMPHILON  2,474,755
COIL WINDING MACHINE
Filed Sept. 12, 1947  5 Sheets-Sheet 4
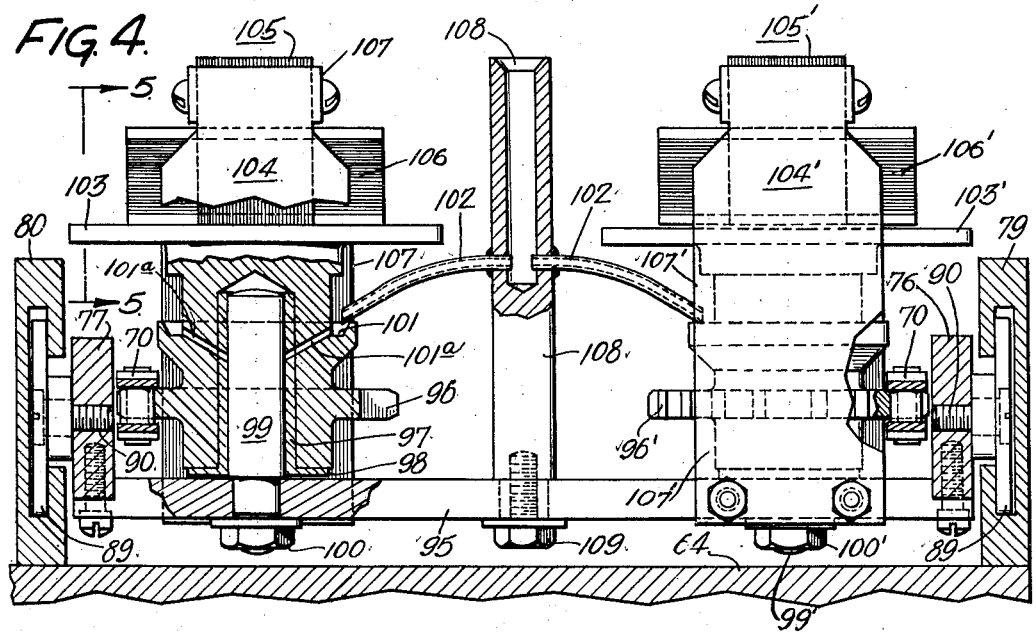
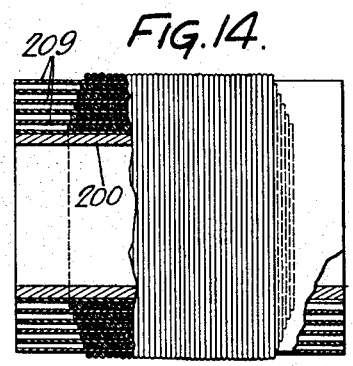
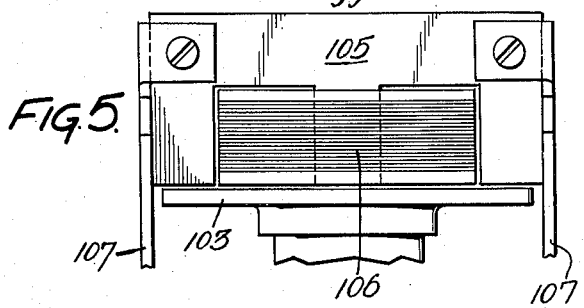
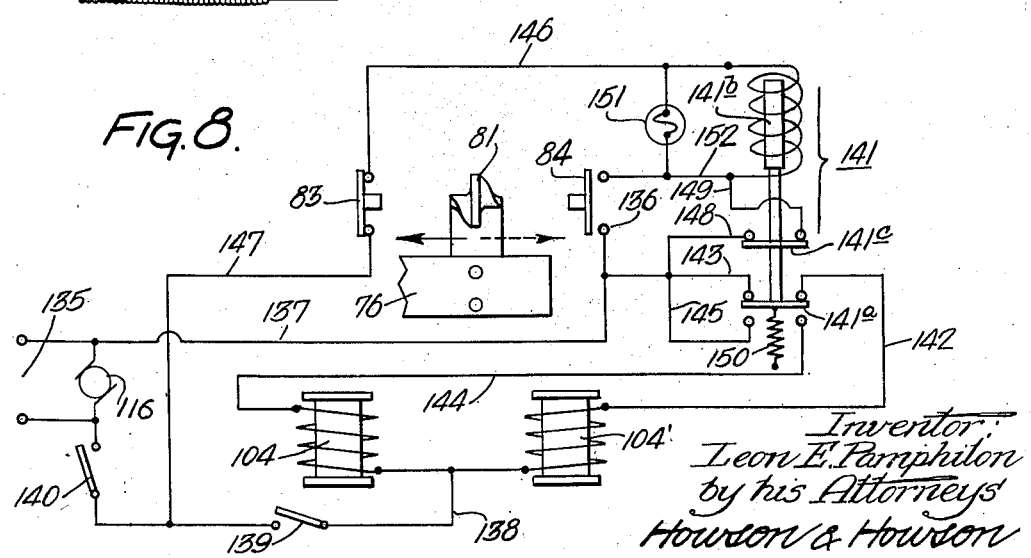
Inventor:
Leon E. Pamphilon
by his Attorneys
Howson & Howson June 28, 1949.  L. E. PAMPHILON  2,474,755
COIL WINDING MACHINE
Filed Sept. 12, 1947  5 Sheets-Sheet 5
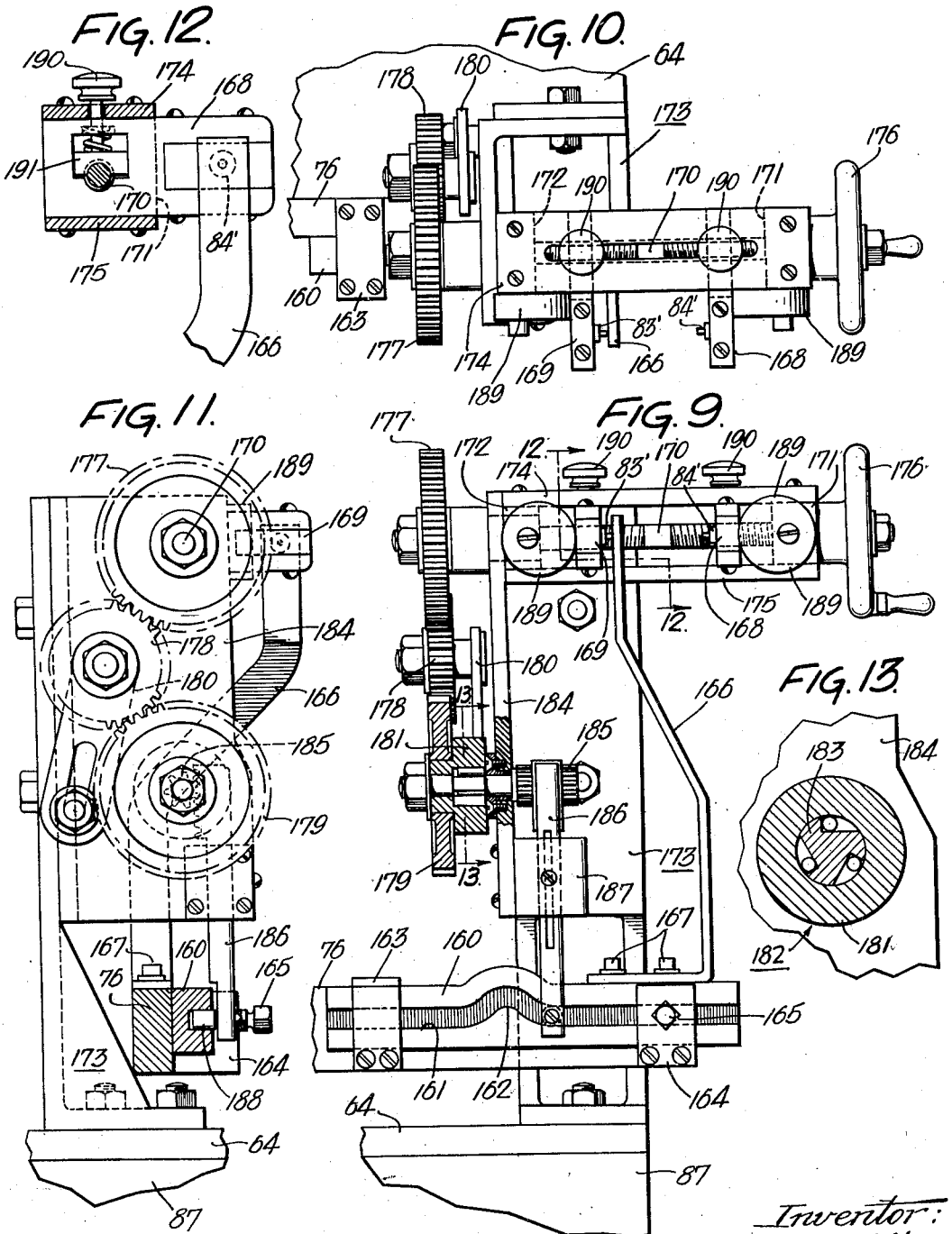

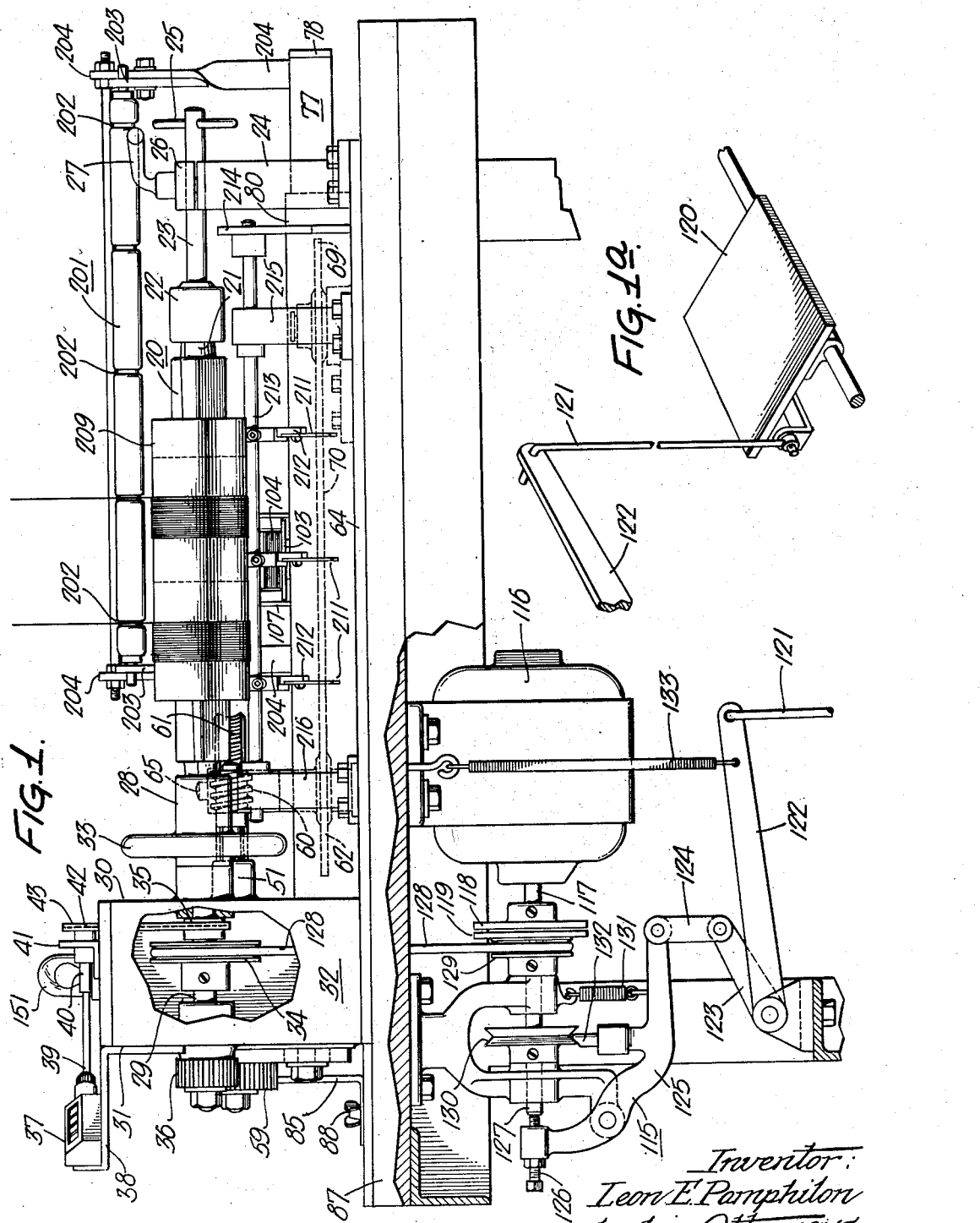

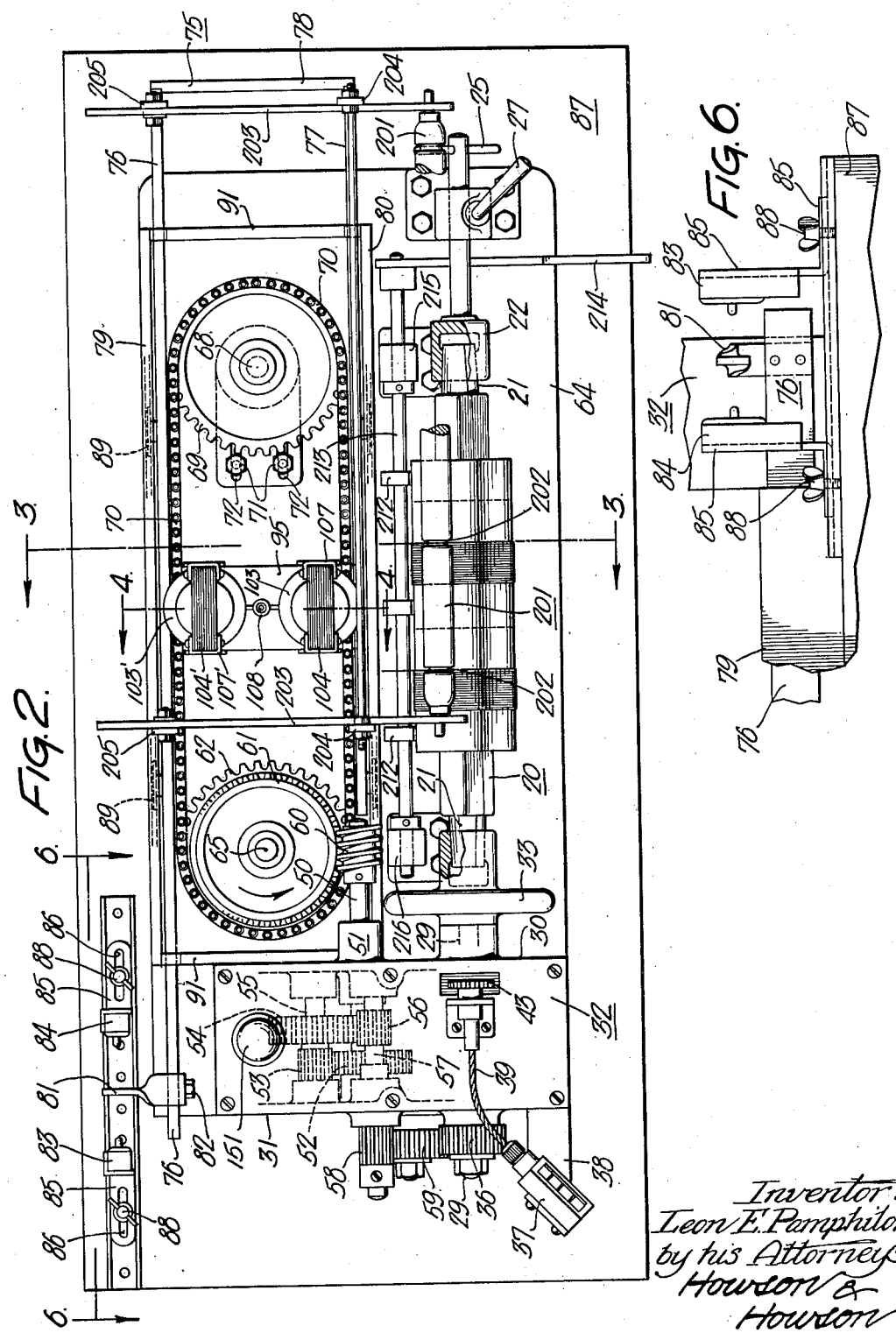

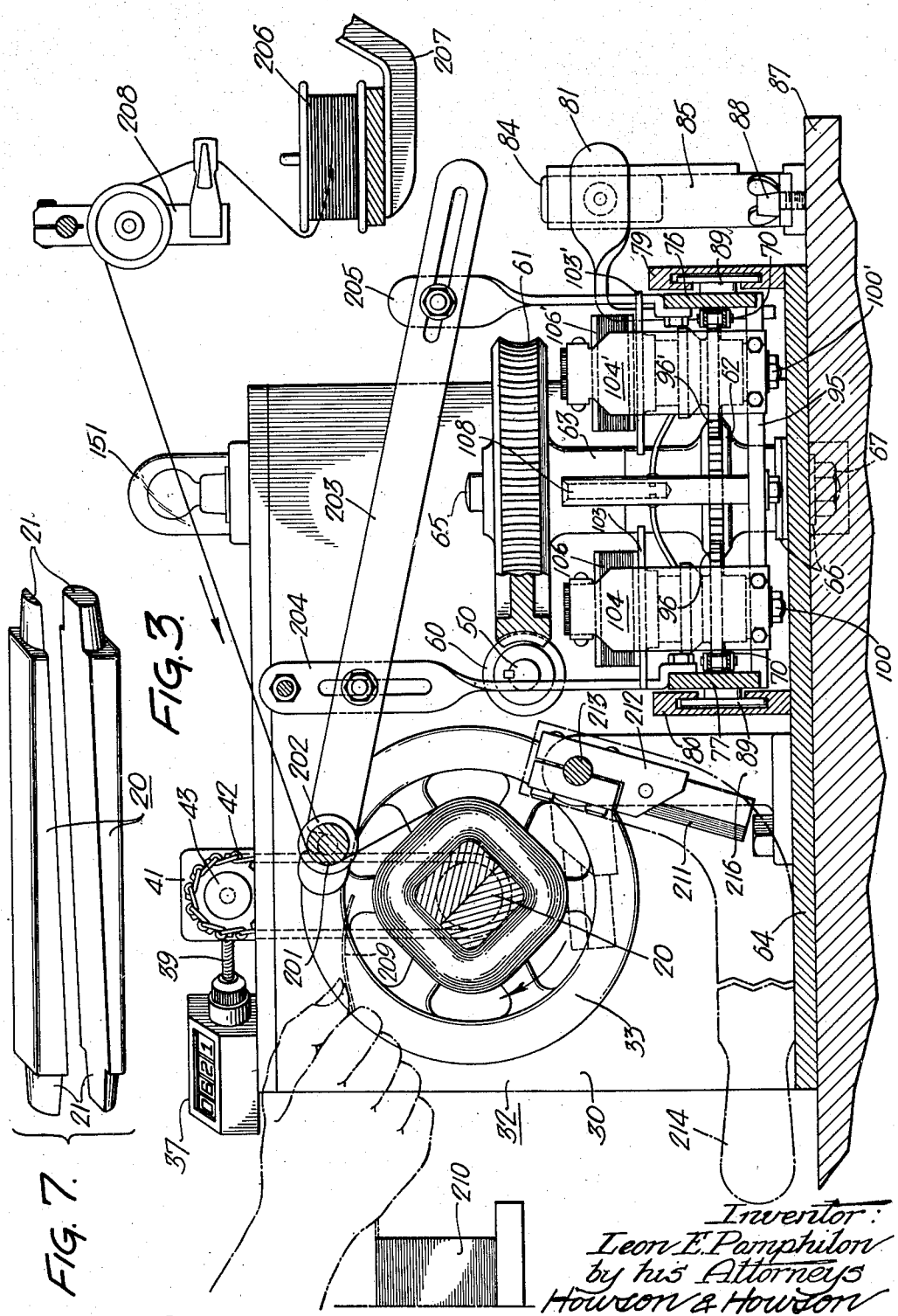

Patented June 28, 1949

2,474,755

UNITED STATES PATENT OFFICE 2,474,755

COIL WINDING MACHINE

Leon E. Pamphilon, Yeadon, Pa., assignor to Airdesign, Incorporated, Upper Darby, Pa., a corporation of Pennsylvania Application September 12, 1947, Serial No. 773,593

9 Claims. (Cl. 242—10)

This invention relates to a machine for winding electrical coils and transformers, and is particularly directed to a machine adapted to wind a plurality of coils simultaneously, as well as to the methods of fabricating the coils.

A primary object of the invention is to provide a power driven apparatus for supporting and turning a mandrel upon which a series of wire coils may be wound in successive radial layers.

A further object of the invention is to provide a coil winding machine having a horizontally supported mandrel adapted to receive a plurality of wires from a grooved roller which is carried by an oscillating member moving in a path parallel to the axis of the mandrel.

A still further object of the invention is to provide an electrical reversing system for a coil winding machine adapted to reverse the carriage travel automatically when either limit is reached.

A still further object of the invention is to provide a coil winding machine adapted to fabricate a tapered coil by automatically decreasing carriage travel in predetermined increments.

The invention also includes means for adjusting the carriage amplitude and frequency with respect to the mandrel speed, as well as the methods of operating the machine.

Further objects will be apparent from the specification and drawings in which:

Fig. 1 is a front view of a coil winding machine constructed in accordance with the invention, partly broken away to show the electric motor and motor drive;

Fig. 1a is a detail of the treadle which operates the electric motor drive;

Fig. 2 is a top view of the structure of Fig. 1;

Fig. 3 is a section taken along the lines 3—3 of Fig. 2;

Fig. 4 is an enlarged sectional detail taken along the lines 4—4 of Fig. 2;

Fig. 5 is an enlarged detail as seen at 5—5 in Fig. 4;

Fig. 6 is a fragmentary view as seen at 6—6 of Fig. 2;

Fig. 7 is a perspective of one of the mandrels used in connection with the winding machine;

Fig. 8 is a wiring diagram of the electrical system;

Fig. 9 is a detail side view of a modified form showing the taper attachment;

Fig. 10 is a top view of the structure of Fig. 9;

Fig. 11 is an end view of the structure of Fig. 9;

Fig. 12 is a sectional view taken along the lines 12—12 of Fig. 9;

Fig. 13 is an enlarged sectional detail taken along lines 13—13 of Fig. 9; and

Fig. 14 is a partly sectioned view of a completed coil as fabricated with the structure of Figs. 9-13.

The invention comprises essentially a horizontally supported split mandrel adapted to receive a hollow coil foundation and to be rotated in the supports by means of a treadle controlled electric motor. A gear train connected to the main spindle which turns the mandrel, serves to drive a sprocket mounted on a vertical axis. This driven sprocket is connected to a second sprocket by means of an endless chain; and a carrier having sprockets engaging opposite lengths of the chain is designed to oscillate back and forth with respect to the axis of the mandrel. The carrier sprockets are normally free to rotate on individual vertical axes but may be selectively clamped with respect to the carrier by means of electro-magnets acting upon discs integral with each sprocket. The carrier is provided with a dog or arm which contacts a pair of limit switches adjustably positioned so that when the dog operates one of the switches, the carrier travel is automatically reversed by means of the electromagnets on the carrier sprockets.

If desired, the limit switches may be mounted on a horizontal oppositely threaded shaft so that, at each oscillation of the carrier, the shaft is rotated to move the switches closer to each other, thereby reducing the effective distance between the switches and thus providing gradually decreasing carrier travel.

Referring now more particularly to the drawings, a mandrel 20 having a pair of oppositely disposed lugs 21, 21 may be of any desired outer contour, but in the embodiment shown in Fig. 7 is of generally square cross-section. The mandrel is cut from end to end on a bias in order to facilitate removal from the completely wound coils in a manner to be described more fully hereinafter. The mandrel is supported in a horizontal position, as shown in Fig. 1, by means of a chuck 22 rotatably mounted on arbor 23 which in turn is adjustably supported in pedestal 24. The arbor 23 carries a T-handle 25 which permits the arbor to be moved in the pedestal when locking plate 26 is loosened by means of clamp 27. The opposite end of mandrel 20 is tightly engaged in chuck 28 on spindle 29 which is journaled in the side plates 30 and 31 of a gear box designated generally by 32. Spindle 29 carries a hand wheel 33 adjacent to chuck 28, and a drive pulley 34 is mounted on the spindle inside gear box 32. A small sprocket 35 is also mounted on the spindle between drive pulley 34 and side plate 30 of the gear box. The opposite end of the spindle extends through side plate 31 of the gear box and has a spur gear 36 rigidly keyed thereon. A revolution counter 37 mounted on bracket 38 attached to the gear box is driven from the spindle through flexible shaft 39 connected to shaft 40 which is supported in bracket 41 on top of the gear box. Chain 42 serves to drive revolution counter 37 through sprockets 35 and 43.

A jackshaft 50 (Fig. 2) is also journaled in side plate 30 at 51 and is driven through a gear train consisting of gear 52 on jackshaft 50, gears 53 and 54 on countershaft 55 and gear 56 on countershaft 57 which extends through side plate 31 of the gear box and has gear 58 securely attached thereto. Idler gear 59 meshes with gears 36 and 58 and serves to drive the gear train from spindle 29. The idler gear 59 is carried on an adjustable bracket (not shown) outside of gear box 32. Gears 36 and 58 may be replaced with a variety of gears of different sizes if desired to vary the ratio between spindle 29 and countershaft 50.

A worm 60 is keyed to the extremity of jackshaft 50 which extends through side plate 30 and meshes with worm wheel 61 which is formed integrally with sprocket 62 by means of hub 63. Worm wheel 61 and sprocket 62 are mounted on bed plate 64 and are adapted to rotate about a vertical axis by means of shaft 65 secured to bed plate 64 by means of washers 66 and nut 67.

A post 68 carries a second sprocket 69 in such a manner that the center line connecting sprockets 62 and 69 is parallel to the axis of spindle 29 and mandrel 20. A chain 70 connects sprockets 62 and 69 and means for adjusting the tension of chain 70 is provided by cap screws 71, 71 extending through slots in bracket 72 which is mounted on bed plate 64 and carries post 68.

A carriage 75 has two side frame members 76 and 77 to which are joined an end member 78 to complete the carriage structure which is adapted to oscillate in rails 79 and 80. One end of side frame member 76 of the carriage extends beyond the opposite member 77 and has a dog 81 adjustably clamped thereto by means of set screw 82. Dog 81 extends at right angles to member 76 and actuates a pair of limit switches 83 and 84 (Fig. 6) supported on brackets 85, 85 and having slots 86 to provide for longitudinal positioning of the switches. Brackets 85 are adjustably clamped to the main supporting table or bench 87 by means of thumb screws 88, 88. The location of switches 83 and 84 with respect to dog 81, as well as the position of the dog on frame 76, determines the amplitude and the spacing of the travel of carirage 75. The manner in which this is accomplished electrically will be more fully described hereinafter.

Side rails 79 and 80 have a T-slot running longitudinally therein, each of which carries a pair of rollers 89 journaled on shoulder screws 90 in side frames 76 and 77 of the carriage. The ends of side rails 79 and 80 are connected by transverse spacers 91, 91 which are slotted to permit the side rails 76 and 77 of the carriage to extend therethrough.

Rails 79 and 80, as well as the pedestal 24 and gear box 32 are mounted on steel bed plate 64 which is in turn supported on bench 87.

Referring now to Fig. 4, the carriage frames 76 and 77 are connected at approximately their midpoints by a cross-member 95 securely bolted to the underside of members 76 and 77. A sprocket 96, having an internal bushing 97 which is flanged at the lower end at 98, rotates on a vertical stud or pin 99 secured in member 95 by means of nut 100. The position of pin 99 with respect to side frame 77 is such that the teeth of sprocket 96 engage and retain chain 70 in closely spaced relation with respect to the frame member 77 so that it is impossible for the chain to become accidentally disengaged from the sprocket.

The hub of sprocket 96 extends upwardly and carries an annular cup 101 adapted to receive lubricant from supply tube 102. Lubricant thus deposited in cup 101 flows through passages 101a to the periphery of pin 99 and the bore of bearing sleeve 97. The upper extremity of the sprocket hub carries a disc portion 103 which may be formed integrally with the hub or attached thereto as by welding. An electromagnet designated generally by 104 is mounted immediately over the upper surface of disc 103 so that the normal deenergized clearance between the disc and magnet is on the order of 0.001". Magnets 104 and 104' comprise laminated cores 105 and 105', windings 106 and 106', and are supported from cross-member 95 by means of brackets 107 and 107'.

At the opposite end of cross-member 95, an identical sprocket and electromagnet assembly is mounted so that sprocket 96' engages with the opposite portion of chain 70. An oil reservoir 108 to which lubricant supply lines 102 are attached, is mounted centrally in cross-member 95 by means of cap screw 109. Corresponding parts of the electromagnets and carriage sprocket assemblies are indicated on the drawings by primed numbers.

The function of the magnetically operated sprockets is such that when one of the magnets 104 or 104' is energized, the corresponding disc 103 or 103' is securely gripped by the magnet and thus prevented from turning on pins 99, 99'. It will be apparent that this action has the effect of locking the associated sprocket 96 or 96' insofar as its engagement with chain 70 is concerned thereby causing the carriage 75 to move with chain 70 until the magnet is deenergized, thus permitting the sprocket to turn on pins 99 or 99'. Since a clearance of approximately .001" is ample to permit locking and unlocking of discs 103, 103' there is no problem insofar as vertical movement of the sprockets on pins 99 and 99' is concerned because sufficient clearance may be provided between the sprocket teeth and the chain to enable the sprocket and its hub to move vertically to this limited degree. Since, as will be apparent from Fig. 2, opposite portions of chain 70 move in opposite directions because sprocket 62 always rotates in the same direction, it will be apparent that alternate locking of sprockets 96 and 96' imparts an oscillating motion to the carriage. Likewise, if neither sprocket 96 nor 96' is locked by means of its associated magnet, the carriage will remain stationary and when so unlocked, it can be readily moved to any desired position by hand.

The control of the spindle speed is achieved through a standard sewing machine clutch mechanism indicated generally by 115 (Fig. 1). An electric motor 116 supported from the underside of bench 87 has a shaft 117 to which is attached friction disc 118. A cooperating friction disc 119 is adapted to be urged axially against disc 118 by pressure on treadle 120 (Fig. 1a) acting through rod 121, levers 122 and 123 link 124, lever 125, adjustable pin 126 and shaft 127 to which the disc 119 is keyed. Power is transmitted from shaft 127 to the spindle 29 by means of pulley 34, belt 128 and pulley 129 keyed to shaft 127. A brake disc 130 on shaft 127 automatically retards turning of the spindle 29 and shaft 127 when clutch plates 118 and 119 are disengaged. This braking action is achieved by means of spring 131 which urges brake member 132 against brake disc 130 when lever 125 is in a normally retracted position. Spring 133 attached to lever 122 serves to counteract pressure on treadle 120. It will be understood that the construction and operation of the clutch assembly 115 forms no part of the present invention and is well known.

Referring now to Fig. 8, the electrical wiring of the circuit is such that the energization of magnets 104 and 104' is accomplished automatically by means of switches 83 and 84 to provide reciprocating motion of the carriage 75 in any predetermined constant amplitude.

A convenient direct current source 135 is connected to switch 84 at 136 by means of lead 137 and to both magnets 104 and 104' by means of lead 138. A manually operated switch 139 permits breaking of the circuits to the magnets 104 and 104' regardless of the position of the dog 81 and switches 83 and 84; whereas switch 140 opens the entire control circuit. Motor 116 is connected across the main power leads and is controlled by another switch (not shown). A solenoid actuated relay indicated generally at 141 consists of a double pole, double throw switch 141a, 141c and a solenoid 141b and functions to first energize magnet 104 regardless of the position of dog 81, whenever switch 140 is closed.

When the switches of relay 141 are in the upper position as shown in Fig. 8, magnet 104' is energized through lead 142, switch 141a, leads 143, 137 and 138. When in the lower position, however, magnet 104 is energized through lead 144, switch 141a, leads 145, 137 and 138. Switch 83 is of the normally closed type whereas switch 84 is of the normally open type, so that the operation of the circuit is as follows:

The position of dog 81 in Fig. 8 shows the carriage traveling toward switch 83. Under these conditions, relay 141 is energized through lead 146, switch 83 and lead 147 as well as through leads 137, 148, switch 141c and lead 149. When dog 81 trips switch 83, the circuit to relay 141 is instantly broken as switch 83 opens. This deenergizes solenoid 141b causing switch 141a to be thrown to its alternate or lower position by means of spring 150. At the same time, the circuit to magnet 104 is closed through leads 137, 145 and 144, and the switch 141c is opened. The deenergizing of magnet 104' together with the energizing of magnet 104, immediately causes the carriage to reverse its direction as explained heretofore. Switch 83 immediately closes when dog 81 ceases to engage it, thereby closing the circuit through leads 146 and 147 to solenoid 141b. However, this action fails to energize solenoid 141b since both switches 84 and 141c are now open. When dog 81 trips switch 84, the circuit is closed to solenoid 141b through both switches 83 and 84, whereupon the relay is actuated to again close switch 141c and raise switch 141a to its upper position as shown in Fig. 8. Immediate reversal of the carriage direction is thus accomplished and this reversal is continued despite the fact that switch 84 opens after dog 81 ceases to engage it because the solenoid is now energized through switch 141c instead of through switch 84.

Switch 139 opens the circuit to both magnets 104 and 104' thereby permitting manual operation of the carriage in either direction without opening the main circuit. It will also be apparent that opening of switch 139 in no way affects the operation of relay 141, whereas whenever switch 140 is opened, spring 150 automatically returns the switches to the lower position to close the circuit to magnet 104. The location of switches 139 and 140 together with other details of the circuit, provide that when switch 139 is closed the carriage always moves in the same direction in which it had been moving when switch 139 was opened. However, when switch 140 is closed, the carriage always moves in the same direction with respect to mandrel 20.

In order that the operator may have a visual indication of the point at which the carriage reverses, a bulb 151 is connected across the solenoid leads 146 and 152 so that the bulb will be lighted during one traverse of the carriage and unlighted during the return traverse.

Figs. 9–13 illustrate a modified form of the machine which is utilized to fabricate a coil having a tapered cross-section achieved by means of decreasing the effective traversing movement of the carriage in predetermined regular increments. Instead of the switches 83 and 84 being secured to brackets 85, which are in turn mounted on bench 87, the structure of Fig. 6 can be replaced with the structure of Fig. 9 in which the extension of side frame member 76 is provided with a guide member 160 having a horizontally disposed groove 161 and a cam portion 162 located near the midpoint of guide 160. Brackets 163 and 164 are adapted to clamp guide 160 securely to the member 76 and longitudinal adjustment may be secured by loosening set screw 165 which serves to clamp the guide 160 securely to member 76. The dog 81 of Fig. 6 is replaced in the form of Fig. 9 by an upwardly extending arm 166 bolted to member 76 by means of cap screws 167. The upper end of arm 166 is in alignment with two limit switches 83' and 84' mounted on brackets 168 and 169. Adjustment of the distance between the contacts of switches 83' and 84' is automatically and manually achieved by means of an oppositely threaded shaft 170 horizontally mounted in blocks 171 and 172 which are in turn supported in an elevated position with respect to bench 87 by means of vertical bracket assembly 173 supporting upper plate 174 and lower plate 175. Shaft 170 is secured to the hub of hand crank assembly 176 by which the shaft may be readily turned. The opposite end of shaft 170 extends through block 172 and carries a spur gear 177 driven by gears 178 and 179. Gear 178 serves as an idler gear and is adjustably mounted in bracket 180. The hub of gear 179 is integral with housing 181 of over-running clutch 182 (Fig. 13). Shaft 183 of clutch 182 is journaled in side plate 184 of bracket assembly 173 and extends inwardly thereof to carry a pinion gear 185. Vertical rack 186 is operatively associated with pinion 185 and is slidably supported on side frame 184 by means of bracket 187. The lower extremity of rack 186 carries a horizontally disposed roller or cam follower 188 adapted to ride in groove 161 of guide member 160.

In operation, the function of switches 83' and 84' is identical to that of switches 83 and 84 in Figs. 2 and 6 but the oscillating motion of the carriage 75 automatically moves switches 83' and 84' closer together by means of the threaded shaft 170 on which they are mounted. It will be apparent that every traverse of side member 76 causes cam follower 188 to actuate rack 186 when the cam follower contacts cam 162. Referring to Fig. 9, it will be seen that when rack 186 is raised, gear 179 is turned through clutch 182, causing shaft 170 to rotate a predetermined amount in accordance with the gear ratios and the pitch of the threads on shaft 170. However, when rack 186 is lowered, the over-running clutch 182 prevents reversal of the rotation imparted to gear 179. Switches 83' and 84' are thereby gradually moved closer together so that the oscillations of the carriage decrease in amplitude to cause successive wrappings on the mandrel 20 to be of decreasing length as shown in Fig. 14. When a coil is completed, switches 83' and 84' can be readily reset by means of crank 176 to their initial positions which are in turn determined by the setting of cammed stops 189, 189. Should it be desired to vary the relative relation of the brackets 168, 169 on shaft 170, spring loaded pins 190 are raised to remove threaded segments 191 from contact with shaft 170. This permits the brackets 168 and 169, as well as the switches 83' and 84' to be moved independently in plates 174 and 175 because the brackets 168 and 169 proper are not in threaded engagement with shaft 170.

In operation, a cardboard coil foundation 200 (Fig. 14) is slipped over the sections of mandrel 20 which is then positioned in spindle chuck 28 and tail chuck 22. A grooved roller 201 having the proper number of annular grooves 202 is mounted in brackets 203, 203 which are supported from the side members 76 and 77 of the carriage 75 by means of upright members 204, 204 and 205, 205. Means for adjusting the position of brackets 203 is provided by vertical slots in members 204 and horizontal slots in brackets 203.

The wire with which the coils are fabricated is fed from a spool 206 mounted on a supporting member 207 and fed through a tensioning device indicated generally at 208. The ends of the wire are secured in position to the cardboard foundation 200 by means of gummed tape, after which the main switch 140 is closed. Pressure on treadle 120 then turns mandrel 20 along with coil foundation 200 while at the same time carriage 75 operates back and forth in the manner previously described. The operator, at the end of each traverse, inserts a sheet of paper 209 from a convenient stack 210 and a skilled operator can perform this insertion operation merely by observing lamp 151 without stopping or slowing down the machine. The operator knows in advance the desired number of turns which must be made for each coil and this can be readily ascertained by observing the revolution counter 37. When the coil is completed with the proper number of turns, pressure is removed from treadle 120, the wires cut and the mandrel removed from chucks 22 and 28. The biased split in the mandrel permits it to be easily knocked out of foundation 200, whereupon the coil assembly is ready for the cutting operation. Before removing the mandrel from chucks 22 and 28, however, the proper gaps between coil segments can be marked by means of knife blades 211 carried by brackets 212 which are clamped securely to shaft 213. A handle 214 also clamped to shaft 213 permits rotation of shaft 213 in pedestals 215 and 216 for this purpose.

The embodiment shown in Figs. 1 and 2 shows two coils being wound simultaneously. It will be understood, however, that an additional number of coils may be wound at the same time simply by utilizing a mandrel of different length and a roller 201 having the desired number of grooves. I have found it possible to wind as many as 36 coils simultaneously. Adjustment for the longer mandrels is provided at arbor 23. Furthermore, the ratio between the speed of spindle 29 and countershaft 50 in the form shown may be varied to accommodate wire sizes from No. 16 to No. 44 and the structure provides a 100 to 1 variable drive reduction having no compound gears.

I claim:
1. A coil winding machine comprising a base member, a mandrel adapted to receive a coil foundation, a support on said base member for said mandrel, means for rotating said mandrel, a carriage adapted to oscillate axially with respect to the mandrel, a pair of sprockets mounted on said base member in axial alignment with the mandrel, a chain mounted on said sprockets, driving connections for the mandrel and one of said sprockets, a pair of chain sprockets mounted on said carriage and adapted to engage opposite lengths of said chain, an electromagnet associated with each of said chain sprockets and adapted to electromagnetically lock the chain sprockets with respect to the carriage, and means for selectively energizing the electromagnets to lock the chain sprockets in accordance with the position of carriage travel.

2. In a coil winding machine, the sub-combination of an oscillating carriage adapted to oscillate within the perimeter of an endless chain, a cross member on the carriage, a pair of side members for the carriage positioned in closed spaced relation with the outside periphery of opposite lengths of the chain, a pair of sprockets vertically mounted on the cross member adapted to engage the chain and retain it between the sprockets and the side members.

3. Apparatus in accordance with claim 2 having a hollow vertically mounted post on the cross member, and a lubricant line connecting the interior of the post with the bore of the sprockets.

4. An apparatus in accordance with claim 2 in which each sprocket is provided with a disc of magnetic material, and an electromagnet supported on the cross member in operative magnetic association with the disc.

5. An electrical circuit for a coil winding machine having an oscillating carriage comprising a source of current supply, a stop on the carriage, a pair of limit switches operatively associated with said stop, the first of said limit switches being normally closed, the second of said limit switches being normally open, a double pole double throw relay, a first electromagnet associated with a sprocket on the carriage, a second electromagnet associated with the sprocket on the carriage, and a spring associated with the relay adapted to throw the relay to an initial position when the relay solenoid is deenergized, an electrical connection between the source of power supply, the first limit switch and the relay, an electrical connection between the second limit switch and one of the double throw switches, an electrical connection between the second limit switch and the other double throw switch, and electrical connections between the double throw switch and each of the electromagnets.

6. A coil winding machine comprising a base member, a gear box mounted on said base member, a mandrel horizontally supported on said base member, a spindle supported in said gear box and adapted to drive said mandrel, an electric motor mounted on said base member, means for operatively connecting the electric motor with the spindle, a pair of posts mounted on the base member, a driven sprocket on one of said posts, a wormwheel connected to said driven sprocket, a worm supported by the gear box for driving said wormwheel and sprocket, a second sprocket on the other of said posts, a chain connecting said sprockets, an oscillating carriage enclosing said sprockets in close spaced relation with the chain, a connecting member on said carriage, a pair of carriage sprockets mounted on said connecting member and adapted to engage opposite lengths of the chain, a magnetic switch mounted on said connecting member over each carriage sprocket, and a disc member operatively associated with each magnetic switch and secured to the carriage sprockets whereby selective energization of the magnets electromagnetically locks the carriage sprockets to provide locked engagement between the associated carriage sprocket and the chain.

7. A coil winding machine in accordance with claim 6 having a horizontally oppositely threaded shaft mounted axially with respect to the movement of the carriage, a pair of limit switches carried by said threaded shaft, a cam carried by the carriage, and ratcheting means operated by said cam to turn said threaded shaft.

8. As a sub-combination, an oscillating carriage for a coil winding machine, a pair of stationary sprockets mounted within said carriage, a pair of oscillating sprockets mounted on said carriage, a chain connecting said stationary sprockets, opposite portions of said chain engaging the oscillating sprockets respectively, an electro-magnet associated with each oscillating sprocket, and a wire guide supported on the carriage.

9. In a coil winding machine, the sub-combination of an oscillating carriage, a cam mounted on said oscillating carriage, a shaft mounted in axial alignment with the oscillation of the carriage, a bracket for supporting said shaft, opposite threaded portions on the shaft, a carrier on each opposite threaded portion, a limit switch supported in each carrier, a cam follower operatively associated with said cam, means including a gear train and an overrunning clutch for rotating said shaft in accordance with the movement of the cam, and a bracket on the carriage adapted to oscillate between the contacts of the limit switches.

LEON E. PAMPHILON.

REFERENCES CITED

The following references are of record in the file of this patent:

UNITED STATES PATENTS

| Number | Name | Date |
|---|---|---|
| 1,368,536 | Anderson | Feb. 15, 1921 |
| 1,469,470 | Wright | Oct. 2, 1923 |
| 1,764,618 | Franks | June 17, 1930 |
| 1,881,377 | Kierspe | Oct. 4, 1932 |
| 1,935,585 | Tomblom | Nov. 14, 1933 |
| 1,979,227 | Kierspe | Oct. 30, 1934 |

FOREIGN PATENTS

| Number | Country | Date |
|---|---|---|
| 513,700 | France | Nov. 5, 1920 |